United States Patent Office
2,882,207
Patented Apr. 14, 1959

2,882,207

PROCESS FOR INHIBITING THE POLYMERIZATION OF α-CHLORACRYLATE ESTERS AND THE RESULTANT COMPOSITIONS

Harry D. Anspon, Easton, Pa., assignor to General Aniline & Film Corporation, New York, N.Y., a corporation of Delaware No Drawing. Application March 29, 1957
Serial No. 649,326

15 Claims. (Cl. 202—57)

This invention relates to improvements in the manufacture, processing and treatment of polymerizable unsaturated halogen-containing organic compounds and in particular, to α-chloracrylic acid esters and derivatives thereof. Specifically, this invention relates to improvements whereby the handling of such monomeric materials is facilitated during processing and treatments thereof involving the application of heat and other polymerization aids.

The esters of α-chloracrylic acid, and particularly the lower alkyl esters such as methyl, ethyl, propyl, isopropyl, butyl and the like have become increasingly important base materials useful in the manufacture of polymers, which polymers are possessed of outstanding, unusual and unexpected properties. Among the various properties of such polymeric materials are those outstanding physical properties of high heat distortion temperature, high flexural and tensile strength, excellent craze resistance, low notch sensitivity, unique self-extinguishing characteristics in burning tests and complete formability which make these polymers particularly suited for use as a glazing material, especially for the glazing of high-speed aircraft. Among the well known chemical properties of the monomers from which these polymeric materials are prepared is the extreme sensitivity of the monomer to polymerization. In order to prepare a polymer suitable for use as a glazing material and which will be characterized by the above described advantageous physical properties and, in addition, have the desirable and absolutely necessary optical characteristics, it has been discovered that the monomer, before it is subjected to polymerizing conditions to form the final product, must be in an exceptional state of purity otherwise one or several of the above described physical characteristics will suffer thereby. In addition, if the monomer is not handled with the utmost care, and if purification is not carried out to the utmost degree, there will arise in the final shaped polymer, or in the polymer subjected to deforming operations in the making of glazing materials such as canopies and the like, the formation of undesirable color bodies or undesirable bubble formation. It is thus of paramount importance to conduct the preparation of the monomer under the most stringent of conditions in order to successfully attain and achieve the utmost in desirable physical and chemical properties in the final polymer.

In carrying out the necessary processing involving purification of the various monomers contemplated, such techniques as distillations are necessary. These distillations involve, under the most desirable conditions, the application of considerable quantities of heat to the monomer in order to effect the necessary separation of impurities from the monomer. These necessary distillation steps, even when carried out at relatively low temperatures where the "pot" temperature is of the order of 50° C., result in rather large losses of the initial charge due to the premature polymerization of the monomer in the pot. In the absence of any polymerization inhibitor, such losses may amount to 100% of the total charge, or in other words, processing in the absence of any inhibitor is completely worthless and well-nigh impossible if it is desired to obtain pure distilled monomer. With many of the well known inhibitors heretofore employed with vinyl type or ethylenically unsaturated monomers such as hydroquinone, p-tertiary butylcatechol and the like, the results are somewhat improved, but not sufficiently to render the processes economically feasible. Thus, with tertiary butyl catechol, losses are of the order of 25 to 50% in the pot. Hydroquinone, on the other, hand, while a fair inhibitor, contaminates the distilled monomer to the point where, in subsequent polymerization reactions, undesirable color formation occurs. In addition, this particular inhibitor, present as a contaminant, prevents good control of the subsequent polymerization process with many of the desirable polymerization catalysts.

I have discovered that it is possible to process and purify monomers of α-chloroacrylic acid esters employing distillation techniques involving the application of heat to the monomer and at the same time, avoiding any premature polymerization thereof in the pot. In addition, I have discovered that it is possible to obtain an excellently purified monomer product in high yields devoid of any polymerization inhibitor contaminants, thereby insuring the successful attainment of a shaped polymer therefrom in subsequent polymerization processes.

It is therefore an object of my invention to provide a new process whereby monomers of α-chloracrylic acid esters may be processed and handled without premature polymerization thereof.

It is a further object of my invention to provide a process whereby highly purified monomeric acid esters may be prepared devoid of contaminants which interfere with subsequent polymerization thereof.

It is still another object of my invention to provide processes for the distillation of α-chloracrylic acid esters employing heat whereby pot losses due to premature polymerization are minimized.

It is still another object of my invention to provide compositions comprising monomeric esters of α-chloracrylic acid which exhibit outstanding stability towards polymerization while under the influence of heat.

Others objects will appear hereinafter as the description proceeds. The objects of this invention are achieved by incorporating into the monomeric α-chloracrylic acid ester, tetrahydroxy leuco anthraquinone. The amount of this compound to be incorporated will, of course, vary, and is not critical, but it has been found that amounts from about 0.001% up to about 1% thereof based on the weight of the monomer provide adequate protection to the monomer under the conditions hereinafter to be described.

In order to determine the efficiency of polymerization inhibitors and make a comparison among the various compounds tested for such inhibition characteristics, the following test procedure was employed. Methyl chloracrylate which had been previously vacuum distilled under pre-purified nitrogen and which possessed a freezing point of −36.26° C. was poured into 20 mm. outside diameter test tubes on which had been sealed 10 mm. outside diameter necks. These necks were attached to a 2 in. length of polyvinyl alcohol tubing which could be sealed off with a pinch clamp. The test tube had previously been coated with a solution of polyvinyl alcohol and Congo red. This solution, on drying, deposited a red film over the glass through which observation of the contents of the tube could be made, but which would filter out light of the wave lengths responsive for polymerization. Each of these tubes holds approximately 33 ml. of monomer when filled up to the neck at the point where the polyvinyl alcohol tubing is attached.

The compounds to be tested for inhibiting characteristics are weighed into each tube prior to the addition of the monomer and each tube swept with pre-purified nitrogen. After adding the monomer to the tube, the polyvinyl alcohol tubing is pinched shut so that no air may contact the liquid monomer present below the pinch clamp. The tubes are then sealed off and placed on a large mixing wheel which rotates at 3 revolutions per minute. The following heating cycle is employed in the test procedure:

4 days at 20–25° C.
5 hrs. at 50° C.
10 days at 20–25° C.
19 hrs. at 35–40° C.
3 days at 45–50° C.
5 days at 55–60° C.
Remainder of time at 65–70° C.

Each of the tubes on the mixing wheel is observed to determine the time required to gel or to form a non-flowing polymer in the tube while rotating at 3 revolutions per minute. Employing the above described testing procedure, the following materials were used for each 33 ml. of methyl-α-chloracrylate monomer:

0.04 g. 1,5-diamino anthraquinone
0.04 g. 1-amino-4-hydroxy anthraquinone
0.04 g. thiourea
0.04 g. copper powder
0.04 g. phenol
0.04 g. p-tertiary butyl catechol
0.04 g. sulfur The pure monomer with no added inhibitor was found to require 28 days to gel in the above described test procedure. The monomer containing copper powder gelled in 3 days 4 hrs., that containing the 1,5-diamino anthraquinone in 10 days, that containing the 1-amino-4-hydroxy anthraquinone in 18 days, with thiourea 20 days and with phenol 27 days. Each of these materials, thus, it will be observed, while heretofore described as vinyl type polymerization inhibitors, actually, with the monomers contemplated in this invention, instead of being inhibitors of the polymerization reaction, appeared to catalyze it. The p-tertiary butylcatechol, on the other hand, and sulfur gave somewhat better results, the former requiring 32 days and the latter 28 days. The same procedure employing 0.04 g. of 1,4,5,8-tetrahydroxy leuco anthraquinone did not produce any gel of the monomer after 147 days, clearly indicating the vastly superior and unexpected inhibiting characteristics of this particular compound with the monomer with which this invention is concerned. The following example will serve, further, to illustrate the vastly superior benefits to be derived from the use of the inhibitor above described.

*Example 1*

A charge of 1000 ml. of methyl-α-chloroacrylate having a freezing point of −37.10° C. and 1.2 g. of 1,4,5,8-tetrahydroxy leuco anthraquinone is placed in a flask provided with a distillation column. The entire system is swept and maintained under nitrogen. The charge is then distilled under a high vacuum of 30 mm. of mercury. The temperature of the pot throughout the distillation ranges from about 59 to 62° C. The recovery of purified methyl-α-chloracrylate is 978 ml. The product has a freezing point of −36.50° C. and represents a product having a purity of better than 99.7%.

*Example 2*

The procedure of Example 1 is repeated except that the inhibitor employed is tertiary butylcatechol in the same amounts. Only 560 mls. of monomer are recovered having a freezing point of −36.80° C.

*Example 3*

The procedure of Example 1 is repeated with two separate charges of methyl-α-chloroacrylate employing in one case 0.12 g. per liter of monomer and in the other case 12.0 g. per liter of monomer. In the first case there is recovered 969 ml. of purified monomer and in the second case 982 ml., representing in these instances a recovery rate of about 97 to 98%.

*Example 4*

To a charge of 1000 ml. of methyl-α-chloroacrylate containing in a flask there are added 0.8 g. of 1,4,5,8-tetrahydroxy leuco anthraquinone and 0.4 g. of chloranil. The latter is employed to prevent polymerization outside of the still-pot and especially where there is lengthy reflux of the monomer. The use of chloranil for such purposes is fully described in copending application Serial No. 649,305, filed March 29, 1957. The original monomer has a freezing point of −37.21° C. The charged flask is then provided with a reflux column and the entire system swept with and maintained under nitrogen. Distillation is then carried out under a vacuum of 30 mm. of mercury employing a pot temperature range from about 59 to 62° C. The reflux time for the entire charge is adjusted to 12 hrs. There is recovered at the end of this time 990 ml. of highly purified methyl-α-chloracrylate monomer. The product has a freezing point of −36.41° C. This example demonstrates the increased efficiency of distillation and yield of monomer taking advantage of the inhibiting characteristics of chloranil, especially in the still column. Since by lengthy refluxing it is possible to obtain a more highly purified monomer, it is advisable to employ this inhibitor adjuvant where the monomer is subjected to long periods of heating such as is the case during refluxing operation.

*Example 5*

A charge of 1000 ml. of methyl-α-chloroacrylate and 2.1 g. of 1,4,5,8-tetrahydroxy leuco anthraquinone which has a freezing point of −37.16° C. is placed in a suitable flask provided with a reflux distillation column. The column is packed with small squares (about a quarter of an inch on each side) of stainless steel foil, the corners of which have been turned to provide bulk, and therefore give sufficient free space in the reflux column. On these pieces of packing there is deposited copper oxide (CuO). The amount of the oxide employed is 5% based on the weight of the stainless steel packing. The entire system is then swept with nitrogen and maintained under this gas throughout the subsequent distillation operation which is carried out at a pot temperature of about 59 to 62° C. and under a vacuum of 30 mm. of mercury. There is recovered from this procedure 986 ml. of monomer which has a freezing point of −36.27° C.

The use of copper oxide in the still column to prevent and inhibit the polymerization of the refluxing monomer is more fully described in my copending application Serial No. 650,306, filed April 3, 1957.

It will be observed from the above examples that the tetrahydroxy leuco anthraquinone herein disclosed is an outstanding and superior inhibitor for the polymerization of α-chloroacrylic acid esters. Among the numerous advantages of this compound, in addition to those above described, is the important one of extreme ease of removal of the inhibitor when it is desired to use the monomer in a polymerization process. With many inhibitors it is necessary to carry out a distillation process. Where the monomer is obtained from a batch in storage it will normally contain inhibitor. The only time this would not be so would be when distilled monomer is to be employed immediately in a polymerization reaction. Removal of inhibitors by distillation are obviously costly, time consuming and generally undesirable techniques. With some monomers it is possible to remove inhibitors by washing with various reagents. This is not feasible or desirable with the monomers herein contemplated since any such technique would require further distillation to sufficiently purify the monomer for subsequent polymerization. It has been unexpectedly discovered that the inhibitor of this invention is satisfactorily and quantitatively removed from the monomer by passing the monomer through a column or bed of alumina. The recovery of monomer from such treatment is substantially quantitative and the purity in no way affected. By this simple expedient, inhibited monomer is then ready for any further polymerization reactions.

Variations and modifications which will be obvious and apparent to those skilled in the art may be made in the procedure above described without departing from the scope and spirit of my invention.

I claim:

1. A composition comprising a lower alkyl ester of α-chloroacrylic acid and a polymerization inhibiting amount of tetrahydroxyleucoanthraquinone.

2. A composition comprising a lower alkyl ester of α-chloroacrylic acid and from about 0.001% to about 1% by weight based on the weight of said ester of tetrahydroxyleucoanthraquinone.

3. A composition comprising methyl-α-chloracrylate and a polymerization inhibiting amount of tetrahydroxyleucoanthraquinone.

4. A composition comprising methyl-α-chloroacrylate and from about 0.001% to about 1% by weight based on the weight of the methyl-α-chloroacrylate of tetrahydroxyleucoanthraquinone.

5. A process for inhibiting the polymerization of a liquid α-chloroacrylic acid ester of an alcohol comprising incorporating therewith tetrahydroxyleucoanthraquinone.

6. A process for inhibiting the polymerization of methyl-α-chloroacrylate comprising adding thereto tetrahydroxyleucoanthraquinone.

7. A process for inhibiting the polymerization of methyl-α-chloroacrylate comprising adding thereto about 0.001% to about 1% by weight based on the weight of the methyl-α-chloroacrylate of tetrahydroxyleucoanthraquinone.

8. In a process wherein a liquid α-chloroacrylic acid ester is subjected to heat, the step of inhibiting polymerization by the presence of tetrahydroxyleucoanthraquinone in contact with the ester.

9. In a process wherein methyl-α-chloroacrylate is subjected to heat, the step of inhibiting polymerization by the presence of tetrahydroxyleucoanthraquinone in contact with the ester.

10. In a process wherein methyl-α-chloroacrylate is subjected to heat, the step of inhibiting polymerization by the presence of from about 0.001% to about 1% by weight based on the weight of the methyl-α-chloroacrylate of tetrahydroxyleucoanthraquinone in contact with the ester.

11. A process for purifying a liquid ester of α-chloroacrylic acid which comprises distilling said ester in the presence of a polymerization inhibiting amount of tetrahydroxyleucoanthraquinone in contact with the ester.

12. A process for purifying methyl-α-chloroacrylate which comprises distilling said methyl-α-chloroacrylate in the presence of from about 0.001% to about 1% by weight based on the weight of the methyl-α-chloroacrylate of tetrahydroxyleucoanthraquinone in contact with the ester.

13. In the distillation of a liquid ester of α-chloracrylic acid, the improvement which comprises conducting the distillation in the presence of a polymerization inhibiting amount of tetrahydroxyleucoanthraquinone in contact with the ester.

14. In the distillation of methyl-α-chloroacrylate, the improvement which comprises conducting the distillation in the presence of a polymerization inhibiting amount of tetrahydroxyleucoanthraquinone in contact with the ester.

15. In the distillation of methyl-α-chloroacrylate, the improvement which comprises conducting the distillation in the presence of from about 0.001% to about 1% by weight based on the weight of the methyl-α-chloroacrylate of tetrahydroxyleucoanthraquinone in contact with the ester.

References Cited in the file of this patent

UNITED STATES PATENTS

| | | |
|---|---|---|
| 2,233,835 | Crawford et al. | Mar. 4, 1941 |
| 2,241,770 | Dreisbach et al. | May 13, 1941 |
| 2,388,041 | Craig | Oct. 30, 1945 |
| 2,399,340 | Franz | Apr. 30, 1946 |
| 2,407,861 | Wolk | Sept. 17, 1946 |
| 2,476,528 | Barnes | July 19, 1949 |
| 2,694,726 | Anspon | Nov. 16, 1954 |
| 2,704,770 | Anspon | Mar. 22, 1955 |

FOREIGN PATENTS

| | | |
|---|---|---|
| 528,761 | Great Britain | Nov. 6, 1940 |
| 750,358 | Great Britain | June 13, 1956 |